United States Patent [19]

Gold

[11] 4,153,912
[45] May 8, 1979

[54] APPARATUS AND METHOD FOR ELECTRONICALLY IMPROVING THE APPARENT RESOLUTION OF A COLOR IMAGING CCD

[75] Inventor: Nathan Gold, Framingham, Mass.

[73] Assignee: Polaroid Corporation, Cambridge, Mass.

[21] Appl. No.: 890,122

[22] Filed: Mar. 27, 1978

[51] Int. Cl.² .............................................. H04N 9/07
[52] U.S. Cl. ............................................................ 358/44
[58] Field of Search ............................. 358/43, 44, 11

[56] References Cited

U.S. PATENT DOCUMENTS

| 3,681,520 | 8/1972 | Schneider | 358/37 |
| 3,732,360 | 5/1973 | Breimer | 358/37 |
| 3,909,803 | 9/1975 | Bankowski et al. | 357/24 |
| 3,919,468 | 11/1975 | Weimer | 250/211 J |
| 3,971,065 | 7/1976 | Bayer | 358/41 |
| 3,982,274 | 9/1976 | Chai | 358/41 |
| 4,003,079 | 1/1977 | Woo | 358/31 |
| 4,047,203 | 9/1977 | Dillon | 358/44 |
| 4,059,839 | 11/1977 | Yamanaka et al. | 358/44 |
| 4,064,532 | 12/1977 | Yamanaka | 358/44 |
| 4,065,785 | 12/1977 | Adcock et al. | 358/44 |

FOREIGN PATENT DOCUMENTS 2504617  4/1976  Fed. Rep. of Germany ............ 358/44

Primary Examiner—John C. Martin
Attorney, Agent, or Firm—Edward S. Roman

[57] ABSTRACT

An electronic camera apparatus and method for providing increased apparent resolution in a color imaging system are described. The apparatus and method employ a transducing array of photosensitive elements, each element being operably associated with one of a plurality of selected wavelength ranges. An electrical circuit samples the output signal train from the transducing array and generates a plurality of color representing signals. The electrical circuit fills in gaps occurring in each color signal with amplitude values derived from processing at least two of the color signals. The method and apparatus thereby maintain sharp and aligned edge information in each of the color signals.

9 Claims, 3 Drawing Figures

APPARATUS AND METHOD FOR ELECTRONICALLY IMPROVING THE APPARENT RESOLUTION OF A COLOR IMAGING CCD

BACKGROUND OF THE INVENTION

This invention relates generally to a method and an apparatus for color imaging, and in particular the invention relates to a method and an apparatus for improving the apparent resolution of an electronic color imaging system, for example of the television type.

Arrays of image receiving elements and in particular charge coupled devices (CCD's) are presently used in commercially available products, such as television cameras, for converting a visual image into an ordered sequence of electrical signal amplitudes. In commercial color television, for example, where high quality images are required and where cost is not a significant limiting factor, optical elements split the incoming image and focus it onto three separate CCD arrays. Prior to reaching the CCD arrays, each split image optical signal passes through a filter having a different optical bandpass. Each CCD array then corresponds to and provides an electrical output representative of one of the three required color signals which together generate at the color display apparatus, e.g., a television receiver, the red, green and blue primary color signals which make up the color image. Currently available CCD arrays provide enough resolution so that a three array system can be used in commercial television applications in place of older equipment.

Charge coupled devices however are quite expensive. Thus, many approaches other than a three CCD array system have been tried to tap the consumer market for a solid state, moderate cost television camera. Generally, each moderate cost approach uses a single CCD array masked with an optical filtering element. The filtering element may be, for example, a sequence of stripes or another repeating grid of filter elements having a plurality of different bands of image transmission wavelength ranges. These systems, however, suffer from poor resolution because the three different color signals, which make up the eventually formed color image, result from a single scan of the single CCD array. Therefore the resolution offered by the single CCD array is reduced by a factor of three for each color signal. Various attempts have been made to compensate for this loss of resolution. These corrective schemes however have generally been unsuccessful, often because they merely trade between resolution in the horizontal and vertical directions.

A principal object of this invention is therefore a color imaging camera and method using a single array of photosensitive elements, typically a CCD array, wherein the apparent resolution of the system is substantially identical to the resolution of a system using three such arrays. Other objects of the invention are a method and apparatus for increasing the apparent resolution of a color image which is simple in structure, moderate in cost, reliable, and which provides an aesthetically pleasing, distortion free, output image. Further objects of the invention are an apparatus which uses commercially available components, and which provides output signals compatible with present network television and industry standards.

SUMMARY OF THE INVENTION

A color electronic camera according to the invention has an image receiving device, generally consisting of a plurality of photosensitive elements, for generating and storing electrical image signals representative of the incident image energy. The elements are arranged in a plurality of image receiving scan lines. An optical bandpass filter having a plurality of filtering segments arranged in a repeating pattern is placed in a selected optically aligned spatial relationship with the image receiving device. Thereby, each photosensitive element is associated with one filtering segment for receiving energy in one of a plurality of selected wavelength ranges.

The color camera further includes an electrical circuit for retrieving the stored electrical image signals on a scan line-by-scan line basis. The circuit provides the retrieved electrical signals, which correspond to the photosensitive elements of a scan line, in sequentially occurring time intervals. Each time interval is identified and associated with a signal amplitude level corresponding to one of the selected wavelength ranges. The electrical circuit further includes circuit elements for deriving from the retrieved electrical signals a number of electrical color-responsive output signals equal to the number of selected wavelength ranges.

The color camera features the improvement wherein the "deriving" circuit elements include a comparison circuit for comparing, for each successive active time interval, the signal amplitude level of the retrieved electrical signal with the corresponding next earlier and next later coordinated signal amplitude levels of that retrieved signal. (As defined more fully below, "coordinated" relates to signals associated with like wavelength ranges, e.g., colors.) The circuit generates a comparison output signal indicating which of the next earlier and next later coordinated signal amplitude levels is closer in value to the amplitude level of the retrieved signal during the active time interval.

The invention further features circuitry for providing, for each successive active time interval, a signal amplitude level for each of the electrical color signals. The color signal corresponding to the wavelength range associated with the then active time interval has an amplitude value corresponding to the amplitude value of the retrieved signal during the active time interval. Each other color electrical signal has an amplitude value corresponding to an associated coordinated time interval as determined in response to the comparison output signal. In a preferred aspect of the invention, the apparatus features a circuit for providing for each of the other color electrical signals, the signal amplitude level of the retrieved signal in a next coordinated time interval which is positioned in a direction determined by the comparison output signal.

The method according to the invention for generating a plurality of electrical color signals from a color camera includes the steps of repeatedly generating a scan line-by-scan line electrical scanning image signal, from a photosensitive, multiple-element image-receiving device. The scanning signal is representative of the light incident on the device in each of the photosensitive elements of the device. As before, each element is associated with and receives energy in one of a plurality of selected wavelength ranges. The method further includes the step of generating a plurality of electrical color signals from the scanning image signal, the number of color signals being equal to the number of wavelength ranges.

The method according to the invention features the steps of passing the scanning image signal through a delay element for providing a plurality of time-interval output signals that represent, at any time instant, plural sequential photosensitive elements. The generating step includes, for each sequential active time interval, setting the amplitude level of the color signal, which corresponds to the wavelength range then associated with a selected one of the delay element output signals, equal to the signal amplitude level on the selected delay element output. The method further features the steps of determining whether the selected delay element output signal is closer in value to a next previous or a next later coordinated delay element output signal, and setting the output level of each other color signal during the active time interval equal to the delay element signal amplitude level of either the next previous or next later associated coordinated time interval according to the results of the determining step.

A particular aspect of the inventive method further features the step of selecting the associated coordinated time interval for each of the color signals from the nearest associated coordinated time interval in the direction of the one coordinated delay element output signal which is closer in value to the active signal.

The inventive method and apparatus thus provide color image representing signals from a single photosensitive array having an apparent resolution comparable to the three array systems of commercial television cameras. The apparent increase in resolution is attained by generating edge transitions at the same positions in each of the color representing systems. The resulting apparent image quality surpasses the capability of the prior art systems.

BRIEF DESCRIPTION OF THE DRAWINGS

These and other objects, features, and advantages of the invention will appear from the following description of a preferred embodiment of the invention taken together with the drawings of which.

DESCRIPTION OF THE ILLUSTRATED EMBODIMENT

Figure 1:
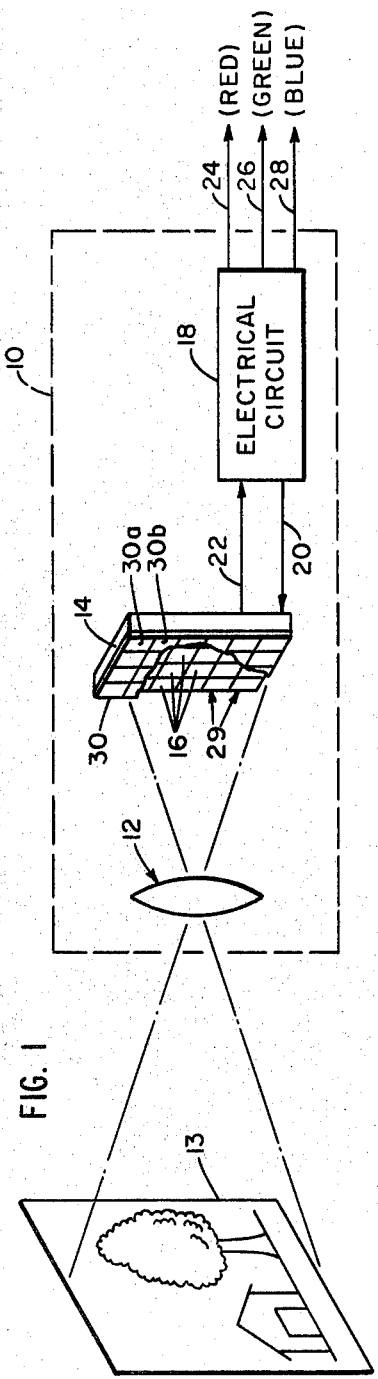
FIG. 1 is a schematic representation of an overall camera system according to the invention.

Referring to FIG. 1, a color imaging electronic camera 10, according to the invention, has a focusing lens system 12 which focuses a scene 13 onto an opto-electrical image receiving device 14. Device 14 has a plurality of photosensitive elements 16, each of which converts received illumination into an electrical signal representation. Receiving device 14 is typically an array of charge coupled devices (a CCD array) such as those manufactured by Fairchild Semiconductor under the model number CCD-221.

An electrical circuit 18 controls the reading and other operations associated with receiving device 14 by electrical signals over lines 20. The circuit 18 receives the electrical representations output from image receiving device 14 over lines 22. The electrical circuit 18 processes the incoming signal data over lines 22 to provide a triplet of scene-representing electrical color output signals over lines 24, 26, and 28. In the illustrated embodiment, the output signals over lines 24, 26, and 28 represent the primary colors, red, blue, and green. In other embodiments of the invention, these output signals can be other color representing signals such as those provided in a commercial television system.

The photosensitive elements 16 form a plurality of scan lines 29; and in the illustrated embodiment, the image receiving device 14 has photosensitive elements 16 arranged along two mutually perpendicular axes to provide a plurality of scan lines and columns arranged at right angles to each other. In a typical image device 14, there are almost five hundred or more lines; and each line may typically have almost four hundred or more elements 16. Hence, there are in effect about 200,000 light transducing sites.

Camera 10 further has a filtering array 30 positioned in front of, and in the illustrated embodiment in contact with, the individual photosensitive elements 16 of receiving device 14. Filtering array 30 has a plurality of filter segments or elements 30a, 30b, ..., and each segment allows a selected wavelength band of the light incident thereon to pass through the filter and impinge upon associated photosensitive elements 16. In the illustrated embodiment, the filtering array has repeating stripes of filter segments with red, green, and blue passbands. Each filtering stripe is associated with a column of photosensitive elements. (In other embodiments of the invention, the filter segments can form a checkerboard pattern having a periodically repeating array of segments, the filter segments having a one-to-one correspondence with the photosensitive elements 16.) A typical construction of the filtering array is described in a paper entitled "Integral Color Filter Arrays for Solid State Images" by Dillon, Brault, et al.; presented at the International Electron Devices meeting held in Washington, D.C. on Dec. 6, 7, and 8, 1976. In addition to the devices described in that paper, other convenient or desirable arrangements of filter segments can be used.

Figure 2:
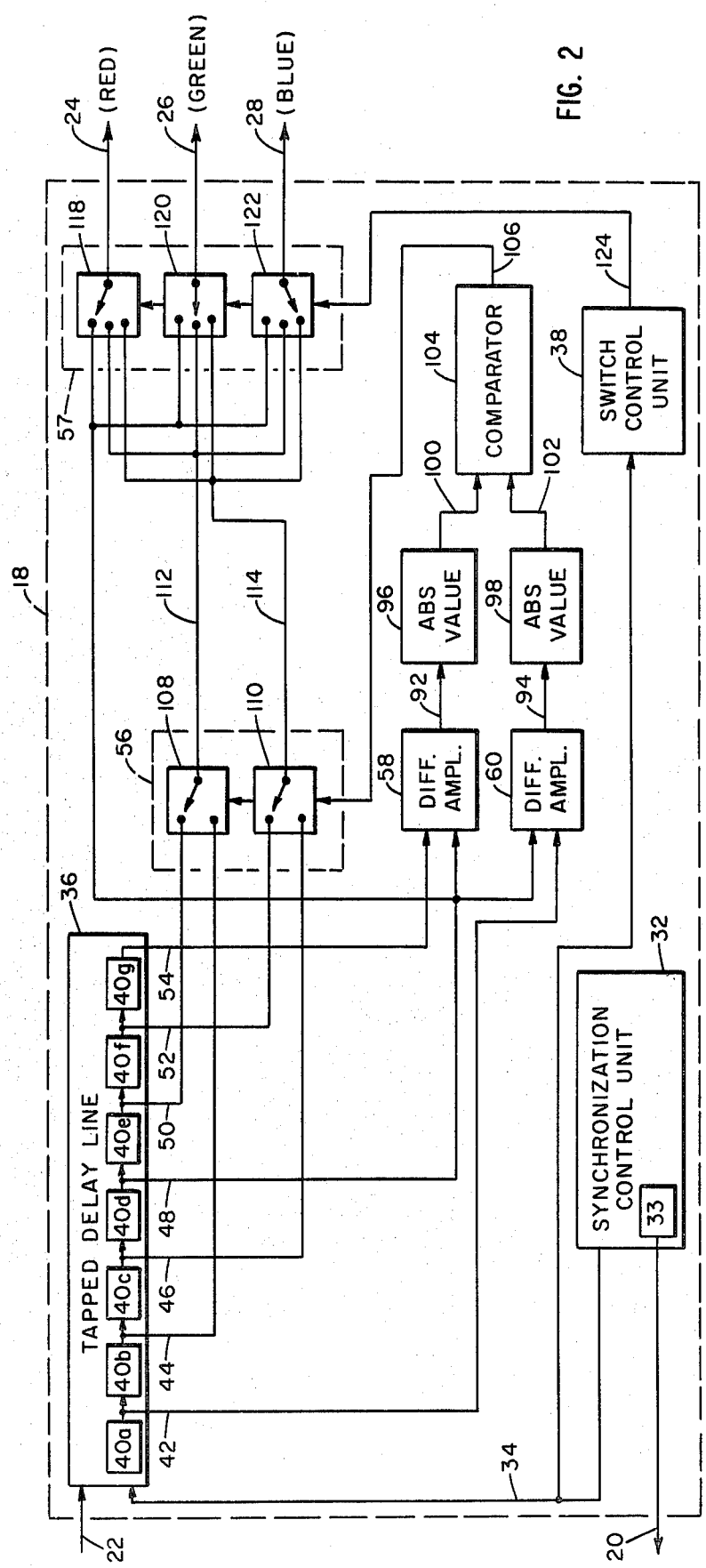
FIG. 2 is an electrical block diagram of a preferred embodiment of the electrical control and processing circuit according to the preferred embodiment of the invention.

Referring now to FIG. 2, electrical circuit 18 has a synchronization control unit 32 for controlling the sequence of operations of and synchronization between the electrical circuit 18 and the image receiving device 14. The synchronization control unit has an image receiving control circuit 33 for sequencing the receiving device 14 to provide sequential output signals on a scan line-by-scan line basis in response to control signals over lines 20, as is well known in the art. As is also well known, the illustrated image receiving device both generates and stores, for later retrieval, the electrical signals representative of the energy incident thereon. Synchronization control unit 32 also provides timing pulses over a line 34 for a tapped delay line 36 and for a switch control element 38. The operations of delay line 36 and of switch control element 38 are described in more detail below.

The synchronization control unit provides over line 34 a plurality of pulses which have a repetition rate which corresponds to, and preferably equals, the rate at which the synchronization unit causes image device 14 to transmit color image data over line 22 to the delay line 36. The delay line 36 may be any of those delay lines well known in the art, for example an LC delay line. Preferably, however, delay line 36 has a series sequential connection of plural sample and hold elements 40a, 40b, . . . , 40g for periodically sampling, storing, and shifting, the analog input data received over line 22. After being sampled by element 40a, the data passes from the first sample and hold element 40a to a next sequential element 40b, etc. Thus, the output of each sample and hold element 40 of the delay line shifts down the delay line, from element to element, each time a timing pulse appears on line 34. The outputs of the illustrated tapped delay line 36, over lines 42, 44, 46, 48, 50, 52, and 54, connect to switching elements 56 and 57 and differential amplifiers 58 and 60. The outputs of switching element 57 are the triplet of color signals over lines 24, 26, and 28.

Figure 3:
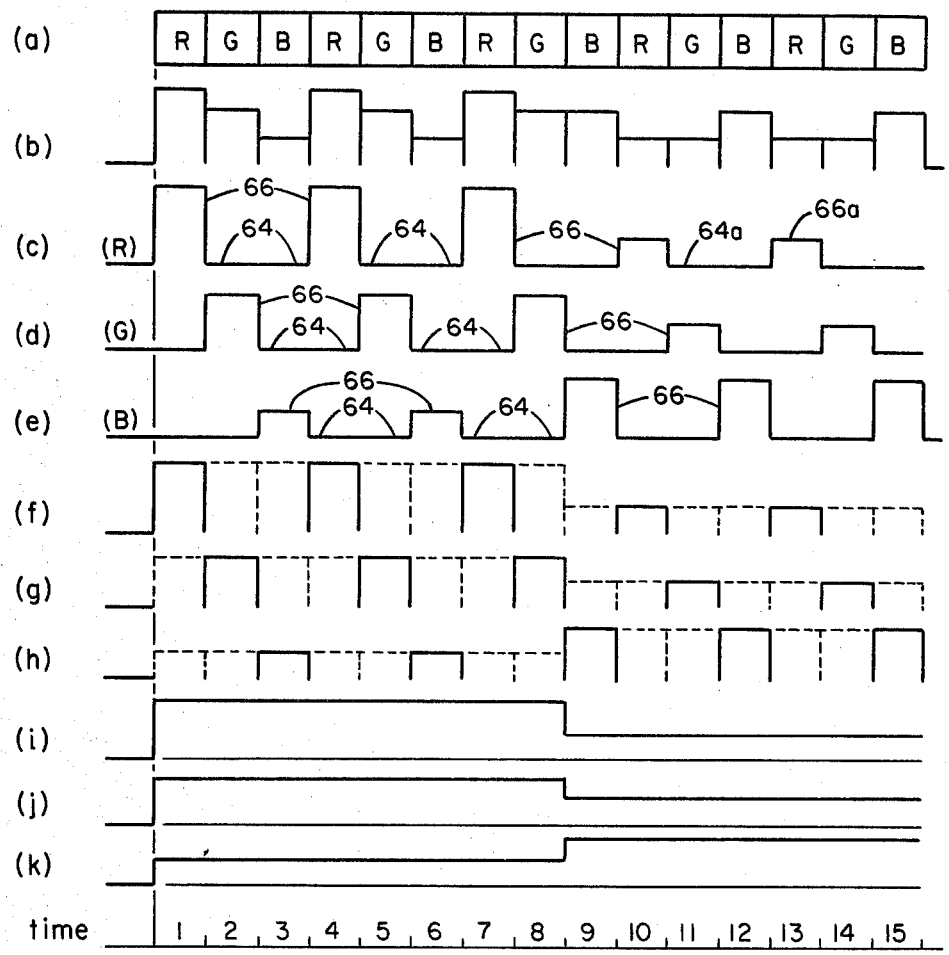
FIG. 3 is a diagrammatic representation of several signal levels during operation of the electrical circuit of FIG. 2 according to a preferred embodiment of the invention.

Before explaining the detailed operation of the electrical circuit of FIG. 2, it is convenient to refer to FIG. 3 to provide a broad understanding of what the electrical circuit 18 accomplishes. Referring to line (a) of FIG. 3, a typical scan line corresponds to a plurality of repeating groups of red, green, and blue (represented by "R," "G," and "B" respectively) image-receiving photosensitive elements. The color or wavelength range associated with each photosensitive element 16 is determined by the patterned array 30 of filter segments. Each segment, which may mask one or more elements 16 (although in the illustrated embodiment, each element 16 is masked by one segment only) allows only that light energy, corresponding respectively to the red, green, or blue visible spectrums, to impinge upon the photosensitive element(s) 16 which it masks.

When the generated output signal corresponding to line (a) of FIG. 3 is retrieved by the electrical circuit 18, the signal levels corresponding to red, green, and blue amplitudes appear as a sequential series of signal levels over line 22 (line (b) of FIG. 3). Since the illustrated image device 14 is read discretely, that is, electrical circuit 18 reads each element 16 individually during a known, preset time interval, the red, green, and blue signals which make up the sequential signal on line 20 (line (b) of FIG. 3) can be easily derived by circuit 18, as is well known in the art, and the resulting individual color component signals are depicted in lines (c), (d), and (e) of FIG. 3. In the illustrated embodiment, line (c) represents the red signal level, line (d) represents the green signal level, and line (e) represents the blue signal level.

The signals over lines (c), (d), and (e) are the raw or naturally occurring signal data which the camera provides for later reproduction of the image. Obviously, by dividing the initial input signal into three separate signals, the resolution, (generally the horizontal resolution) of the original signal is decreased by a factor of three. Prior art systems attempt to improve the apparent resolution of the resulting image in a variety of ways; for example, a low pass filter has been used to average the signals in lines (c), (d), and (e) to fill in the gaps 64 between the coordinated signal information pulses 66 of the respective color signals. This and other prior art schemes for filling in the gaps between coordinated signal information pulses, and thereby increasing the apparent resolution of the displayed image, have not proven successful and may, in fact, introduce undesirable distortion in the resulting picture.

In general, according to the invention, each gap 64 can be "filled in" with amplitude values derived from processing at least two of the color signals. According to the illustrated embodiment of the invention, the gaps 64 (each gap corresponds to the duration of a selected time interval) between coordinated signal pulses 66 of the unmodified color signals (lines (c), (d), and (e) are "filled in" as follows. Still referring to FIG. 3, electrical circuit 18 modifies the raw red, green, and blue signals on lines (c), (d), and (e) respectively, as indicated by the dashed lines of the modified red signal on line (f), the modified green signal on line (g), and the modified blue signal on line (h). The corresponding transmitted signals over lines 24, 26, and 28, appear on lines (i), (j), and (k) respectively. According to the invention, each gap 64, between coordinated signal data pulses 66 of a color signal, is filled with an amplitude value selected from either the next preceding or the next succeeding coordinated data pulse amplitude, as determined below. As used herein, and in the claims, the term "coordinated" refers to a signal pulse 66, or the time interval in which the signal pulse 66 occurs, where the pulse 66 is associated and identified with same wavelength range (or color) as the signal pulse or gap with which it is "coordinated." For example, gap 64a is coordinated with signal pulse 66a which occurs in coordinated time interval 13. Thus, referring for example to the red color signal on line (c), the gap occurring at time interval 2 assumes an amplitude equal to either the pulse amplitude of the red color signal at coordinated time interval 1 or the pulse amplitude of the red color signal at coordinated time interval 4. The decision criteria, according to the invention, for choosing between the allowable amplitude values for a gap occurring during a particular time interval, depend upon a comparison of the amplitude values for the color signal having a naturally occurring signal amplitude value, designated the active signal level, during that particular time interval. Thus, when time interval 2 is active, that is, when the gaps occurring in time interval 2 are being filled in, the active signal level corresponds to the green color signal; for time interval 3, the active signal level corresponds to the blue color signal, etc.

In a particular active time interval then, say time interval 4, electrical circuit 18 compares the amplitude of the red color signal (the active signal in that time interval) with its amplitude in the next succeeding and preceding coordinated time intervals (that is, time intervals in which the red color signal has a naturally occurring, or raw, amplitude value, i.e., time intervals 1 and 7). Of those next succeeding and preceding coordinated time intervals, the one having an amplitude level closest to the amplitude level in the active time interval (the active signal) determines, for that active time interval, the direction from which the signal amplitudes will be chosen to fill in the gaps in the other color signals. Thus, if the amplitude value of the red color signal at time interval 4 is closer in value to the amplitude value of the red signal in coordinated time interval 7, which is a subsequent interval, then the amplitude value of the green signal at time interval 4 is taken equal to the next succeeding coordinated green signal at its coordinated time interval 5 (i.e., which is correspondingly subsequent to interval 4). If, on the other hand, the value of the red signal at time interval 4 were closer in amplitude value to the coordinated red signal amplitude at earlier coordinated time interval 1, then the amplitude value of the green signal at time interval 4 is chosen equal to the amplitude value of the coordinated green signal just prior to time interval 4, in this case, in the coordinated time interval 2. All of the gaps in the red, green, and blue signals are filled in according to the same decision criteria. Those criteria are to compare the signal which is active in a particular active time interval with the next succeeding and preceding coordinated time intervals to determine the direction of the coordinated time interval which is closest in signal value to the active signal amplitude. The amplitude value for the gap(s) in each other color signal are chosen to correspond to a coordinated time interval, for the color signal associated with the gap, which is in the same direction as the "closest" coordinated active time interval. Thus, in FIG. 3, in lines (f), (g), and (h), the dashed lines indicate the level of the filled-in signals; whereas in lines (i), (j), and (k), the signals have been shown to illustrate, without the dashed times, the typical signal levels which will be transmitted from the camera over lines 24, 26, and 28.

As shown in lines (i), (j), and (k), the edges appearing at the boundary of time intervals 8 and 9 occurs at the same time position in each color signal. This corresponds, with high fidelity, to the position of the edge in the original scene. This edge alignment does not occur with prior art schemes, where for example, the signals at lines (c), (d), and (e) are passed through a low pass, averaging, filter.

Referring again to FIG. 2, the illustrated electrical circuit 18 provides the red, blue, and green output signals on lines 24, 26, and 28 as follows. As noted above, the tapped delay line 36 receives the incoming scan line data on line 22. As noted, the illustrated tapped delay line consists of the plurality (seven in the illustrated embodiment) of sample and hold elements 40 which, in response to a signal pulse over line 34, sample the analog signal at their respective inputs, store the sampled value, and make the sampled value available at their respective outputs. The sample and hold elements of the illustrated embodiment have a series sequential connection and hence form a digitally operated, analog signal shift register. Correspondingly, lines 42, 44, 46, 48, 50, 52, and 54 are the outputs of the sample and hold elements 40 and provide a delayed version of the original input signal. Since the method of the invention requires that the incoming signal data be processed both with respect to past as well as future signal data, the middle element of the tapped delay line 36, corresponding to output 48, is selected to be the "local time" for the system. This corresponds, in the illustrated embodiment, to four time intervals after the particular data had been read from the image receiving device 14.

With reference to FIGS. 2 and 3, the signal level output over line 48 corresponds to the signal level at line (b) of FIG. 3; and the photosensitive element corresponding to the output signal on line 48 is what is referred to as the "active element" at the particular active time interval. Of course at different active time intervals, the illustrated active element corresponds, in a repeating sequence, to the red, green, and blue primary colors as determined by the corresponding filter array elements.

According to the method of the invention, the electric circuit compares the signal amplitude level of the active element over line 48 with the output amplitude levels of next earlier and later occurring coordinated time intervals, i.e., intervals associated with photosensitive elements of the same "color" or frequency range. In the illustrated embodiment, this corresponds to outputs of delay line 36 over lines 54 and 42 respectively. In the illustrated embodiment, the comparison circuit elements are the differential amplifiers 58 and 60 which receive, respectively, inputs over lines 48 and 54 and over lines 42 and 48. The differential amplifiers provide output signals over lines 92, 94 respectively to absolute value determining circuit elements 96, 98. The output of each differential amplifier is proportional to the difference between the amplitude levels of the inputs. Differential amplifiers for this purpose are well known to those skilled in the art and will not be described in greater detail here.

The difference outputs over lines 92 and 94 may have either a positive or a negative amplitude, depending upon the relative amplitude of the input signals. The illustrated absolute value circuits 96 and 98 however provide an absolute, positive value over lines 100, 102 respectively equal to the absolute value of the respective input signals. Absolute value circuits 96 and 98 may employ, for example, full-wave rectifying elements as are well known in the art. The outputs of the absolute value amplifiers on lines 100, 102 represent a determination of the "closeness" of the amplitude value on line 48 with the amplitude values on lines 54 and 42 respectively. A comparator circuit 104 receives the absolute amplitude values over lines 100, 102, and provides at its output, over a line 106, a binary signal having a first value if the voltage amplitude on line 100 is greater than or equal to the amplitude on line 102 and a second value if the voltage amplitude on line 100 is less than the voltage on line 102. The output of the comparator circuit controls the operational state of analog switching element 56 and selects the next preceding or succeeding coordinated signal levels to be used to "fill in the gaps" between the naturally occurring pulse signals for those color output lines which do not correspond to the wavelength range associated with tapped delay line output 48.

The switch element 56 preferably consists of two single-pole, double-throw analog switch elements 108, 110. In the illustrated embodiment of the invention, each element 108, 110 consists of two single-pole, single-throw FET analog switching elements as are well known in the art. The elements 108, 110 respond to the comparator circuit output signal over line 106 to select the delay line outputs for presentation to the input of analog switching element 57. Thus, according to the invention, if the output of the tapped delay line over line 48 is closer in amplitude value to the output of the delay line over line 54 than it is to the output of the delay line over line 42, then the outputs of elements 108, 110 are taken from lines 50 and 52 respectively. On the other hand, if the output of the delay line over line 48 is closer in amplitude value to the output over line 42 than it is to the output over line 54, then the output elements 108 and 110 are taken from lines 44 and 46 respectively. The output signals from switches 108 and 110 appear on output lines 112 and 114 respectively.

In different active time intervals, the signals appearing on lines 42, . . . , 54 and hence on the switch output lines 112, 114, represent different wavelength ranges. Hence a synchronous switching element 57 directs the input signals over lines 48, 112, and 114 to the correct color output lines 24, 26, and 28. Switching element 57 preferably consists of three one-pole, three position analog switching elements 118, 120, and 122. Preferably, each three-pole switching element consists of three single-pole, single-throw FET analog switches whose states are responsive to the output of switch control element 38 over lines 124.

The switch control element 38 provides over lines 124 a plurality of binary switch control signals which direct switching element 57 to synchronously connect the proper input signal line to the designated output line. Switch control element 38 receives from the synchronization unit 32 over line 34 pulse data regarding the passage of data from the image device 14 through the delay line 36. This pulse data over line 34 provides switch control element 38 with the necessary timing information to properly coordinate operation of the switching element 57 by generating a plurality of control signals for each of analog switch elements 118, 120, 122.

For example, assume that at a first particular active time interval the output signal amplitudes over lines 42, 48, and 54 are associated with the color red, the signal amplitudes over lines 44 and 50 are associated with the color green, and the signal amplitudes over lines 46 and 52 are associated with the color blue. Assume also that the signal amplitude over line 48 is closest in value to the signal amplitude over line 54. The output of the comparator circuit 104 over line 106 thereby assumes the state which sets the switching elements 108 and 110 of switching element 56 to the position as shown in FIG. 2; and the output over line 52 is fed through to line 114 and the output on line 50 is fed through to line 112. Thus, in this first particular active time interval, line 112 corresponds to the color green and line 114 corresponds to the color blue. It will be recalled that the output lines 24, 26, and 28 represent respectively the red, green, and blue output lines of the illustrated camera. Thus, during this particular active time interval, the output of switch control unit 38 sets the switch elements 118, 120, and 122 of switching element 57 to the positions shown in FIG. 2. The output over line 24 therefore corresponds to the output of the delay line over line 48 (red), the output over line 26 corresponds to the output of the delay line over line 50 (green), and the output over line 28 corresponds to the output of the delay line over line 52 (blue).

During the next active time interval, the output of the delay line over line 48 corresponds to the color blue. The switch elements 108 and 110 of switching circuit 56 may, or may not, change according to the output of the comparator 104. However the switch control unit effectively increments switch elements 118, 120, 122 (in a counterclockwise direction in FIG. 2), so that during this next active time interval element 118 connects the output over line 112 to line 24; element 120 connects the output over line 114 to line 26; and element 122 connects the output over line 48 to line 28. The synchronous "counterclockwise" incrementing of switch elements 118, 120, 122 continues until the scan line has been completed. At the end of each scan line, the control element 38 resets, if necessary, to a begin-line-scan state or condition.

Thus, the sampled data from the image receiving device passes through the delay line 36 with sufficient information being available from the delay line to select the output amplitude values over lines 24, 26, 28. Other embodiments of the invention can employ more or fewer colors or frequency ranges.

Other embodiments of the invention including additions, subtractions, deletions, and other modifications of the preferred embodiment described herein will be obvious to those skilled in the art and are within the scope of the following claims.

What is claimed is:

1. A color electronic camera comprising
    an image receiving device composed of a plurality of photosensitive elements for generating and storing electrical image signals representative of the image energy incident on the elements, said elements being arranged to form a plurality of image receiving scan lines,
    an optical bandpass filter having a plurality of filtering segments in a repeating pattern, said filter having a selected optically aligned spatial relationship with said image receiving device so that each of said photosensitive elements is associated with one filtering segment for receiving energy in one of a plurality of selected wavelength ranges,
    means for retrieving said stored electrical image signals on a scan line-by-scan line basis and for providing the retrieved electrical signals, corresponding to said photosensitive elements of a scan line, in sequentially occurring time intervals, each of said time intervals thereby being identified and associated with a signal amplitude level corresponding to one of said selected wavelength ranges, and
    means for deriving from said retrieved electrical signals a plurality of color electrical signals, the number of color signals being equal to the number of said selected wavelength ranges, said deriving means comprising
        means for comparing, for each successive active time interval, the signal amplitude level of the retrieved electrical signal with corresponding next earlier and next later occurring coordinated signal amplitude levels of the retrieved signal, and for generating a comparison output signal indicating which of said next earlier and next later occurring coordinated signal amplitude levels is closer in value to the amplitude signal level of the retrieved signal in the active time interval, and
        means for providing, for each successive active time interval, a signal amplitude level for each of said color electrical signals,
            the color electrical signal corresponding to the wavelength range associated with the active time interval having an amplitude value corresponding to said retrieved electrical signal amplitude level, and
            each other color electrical signal having an amplitude value corresponding to an associated coordinated time interval signal amplitude level determined in response to the comparison output signal.

2. The camera of claim 1 wherein said signal level providing means comprises means for providing, for each said other color electrical signal, in response to the comparison means output, the signal amplitude level of the retrieved signal in a next coordinated time interval positioned in a direction determined by said comparison means output signal.

3. The camera of claim 2 wherein said image receiving device is a charge coupled device having said photosensitive elements arranged in a perpendicular array of lines and columns.

4. The camera of claim 3 wherein said deriving means comprises
    a tapped delay line for receiving said retrieved electrical signal for providing a plurality of output signals representing time sequential samples of said retrieved electrical signal,
    a synchronization element for controlling synchronization of the retrieving means and the delay line, and wherein said means for providing comprises switching means responsive to the comparison output signal and said synchronization element for switchably connecting the outputs of said delay line to generate said color electrical signals.

5. The camera of claim 4 wherein said camera includes means for generating color electrical signals representing the blue, red, and green primary colors.

6. In a method for generating a plurality of electrical color signals from a color camera having the steps of repeatedly generating from an image receiving device, having a plurality of photosensitive elements, a scan line-by-scan line electrical scanning image signal, said scanning signal being representative of the light incident on said device at each of said photosensitive elements, each element being associated with and receiving energy in one of a plurality of selected wavelength ranges, and generating from the scanning image signal a plurality of color electrical signals, the number of color signals being equal to the number of said wavelength ranges, the improvement comprising the steps of passing said scanning image signal through a sequential delay element for providing a plurality of time interval signal outputs, representative, at any time instant, of plural sequential photosensitive elements, and wherein said generating step comprises, for each sequential active time interval, setting the signal amplitude level of the color signal corresponding to the wavelength range then associated with a selected one of said delay element signal outputs equal to the signal amplitude level on said selected delay element output, determining whether said selected delay element signal output is closer in value to a next previous or a next later occurring coordinated delay element signal output, and setting the output amplitude level of each other color signal during said active time interval equal to the delay element signal amplitude level of a next previous or later associated coordinated time interval determined according to the results of said determining step.

7. The method of claim 6 wherein said second setting step comprises selecting the associated coordinated time interval for a said color signal from a nearest associated coordinated time interval in the direction of the closer in value coordinated delay element output.

8. The method of claim 6
wherein there are three selected wavelength ranges,
wherein said setting steps further comprise switchably connecting the outputs of said delay element to said color signal lines according to the outcome of said determining step, and
further including the step of synchronizing the connection of said delay element outputs to the generation of said scanning image signal.

9. The method of claim 8 wherein said wavelength ranges correspond to red, blue, and green segments respectively of the visible spectrum.

* * * * *